United States Patent
Lou et al.

(10) Patent No.: US 9,307,481 B2
(45) Date of Patent: Apr. 5, 2016

(54) SELECTIVE SYSTEM INFORMATION READING

(71) Applicant: Apple Inc., Cupertino, CA (US)

(72) Inventors: Wenping Lou, Beijing (CN); Jianxiong Shi, Pleasanton, CA (US); Qiang Miao, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/322,070

(22) Filed: Jul. 2, 2014

(65) Prior Publication Data

US 2015/0011213 A1 Jan. 8, 2015

Related U.S. Application Data

(60) Provisional application No. 61/842,330, filed on Jul. 2, 2013.

(51) Int. Cl.
*H04W 36/00* (2009.01)
*H04W 48/12* (2009.01)

(52) U.S. Cl.
CPC ................................... *H04W 48/12* (2013.01)

(58) Field of Classification Search
CPC ..................................................... H04W 36/08
USPC .......... 370/331, 332, 432, 350, 329; 455/444, 455/404.2
See application file for complete search history.

(56) References Cited

U.S. PATENT DOCUMENTS

| 6,600,924 | B1* | 7/2003 | Sinivaara et al. | 455/444 |
| 2008/0233916 | A1* | 9/2008 | Wang et al. | 455/404.2 |
| 2009/0232125 | A1* | 9/2009 | Kim et al. | 370/350 |
| 2011/0199986 | A1* | 8/2011 | Fong et al. | 370/329 |

* cited by examiner

*Primary Examiner* — Martin Mushambo
(74) *Attorney, Agent, or Firm* — Downey Brand LLP

(57) ABSTRACT

A method for selectively reading system information is provided. The method can include a wireless communication device reading system information broadcast by a first cell in a cell group. The read system information can include cell group information identifying the first cell as a member of the cell group and indicating membership of the cell group. The method can further include the wireless communication device moving to a second cell; determining based on the cell group information that the second cell is a member of the cell group; and in response to determining that the second cell is also a member of the cell group, reading only a portion of system information broadcast by the second cell. The read portion of system information can include the system information broadcast by the second cell that is different from the system information broadcast by the first cell.

20 Claims, 7 Drawing Sheets

SELECTIVE SYSTEM INFORMATION READING

CROSS-REFERENCE TO RELATED APPLICATION

This application claims the benefit of priority from U.S. Provisional Patent Application No. 61/842,330, filed on Jul. 2, 2013, which is hereby incorporated herein by reference in its entity.

FIELD

The described embodiments relate generally to wireless communications. More particularly, the present embodiments relate to the use of multi-cell cell groups to reduce an amount of system information read by a wireless communication device.

BACKGROUND

Cellular communications networks are arranged into a network of cells. During operation, a wireless communication device can move between coverage areas of cells due to mobility. As such, the wireless communication device can transition (e.g., through handover) its network connection from one cell to another when moving between cells in a mobility scenario.

Each cell (e.g., a base station associated with the cell) in a cellular communications network can broadcast system information, such as on a Broadcast Channel (BCH). Currently, a wireless communication device reads all system information broadcast by a cell upon transitioning to a new cell. Reading system information can be a relatively time consuming process, which can increase power consumption by a wireless communication device. When a device is stationary or otherwise transitions between cells only relatively infrequently, this overhead may not be a significant problem, as the device may not have to frequently read system information. However, when a device rapidly transitions between cells, such as when in a state of fast mobility, the device has to read system information with increased frequency, resulting in increased overhead and reduced idle state battery life.

Modern cellular radio access technologies (RATs), such as LTE, have implemented reduced cell sizes to provide higher throughput capability and high-band spectrum deployment. Moreover, the Third Generation Partnership Project (3GPP) has introduced the concept of small cells in Release 11 (R11) of LTE, by which small cells, such as femtocells, picocells, and microcells, can be co-deployed with and integrated into a network of standard cells (e.g., macrocells and/or other cells covering a wider area than small cells) within a cellular communications network. The smaller cell size used in LTE and other modern cellular RATs in combination with the integration of small cells has resulted in an increased frequency of cell reselection. Power consumption and overhead for wireless communication devices operating on such networks have accordingly been increased due to the increased amount of system information that is read due to the increased reselection frequency.

SUMMARY

Some example embodiments disclosed herein reduce an amount of system information read by a wireless communication device. More particularly, some example embodiments group cells that share at least a portion of their system information in common into a cell group. Thus, when a wireless communication device in accordance with such example embodiments transitions between cells within a cell group, the wireless communication device can selectively read only that system information broadcast by its new serving cell that is different from system information read from a previous serving cell within the cell group rather than reading all system information broadcast by the new serving cell. As such, the wireless communication device can reduce processing overhead and power consumption by reading only that portion of system information that has changed between cells when moving between cells within a cell group.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
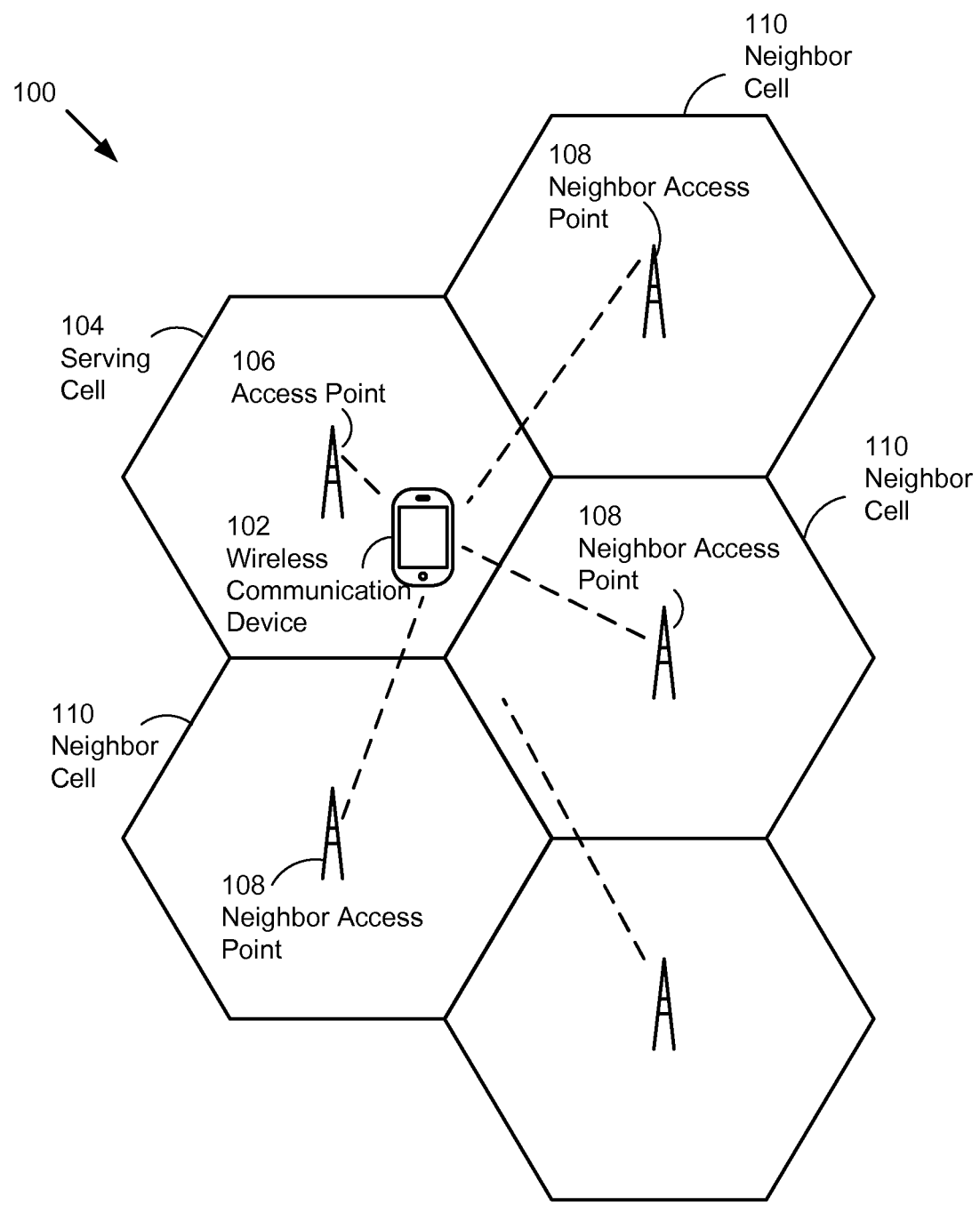
FIG. 1 illustrates a wireless communication system in accordance with some example embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As discussed above, present wireless communication devices must read all system information broadcast by a cell each time the device transitions to a new cell. This can increase processing overhead and battery power consumption by the device, particularly in instances in which the device is relatively frequently transitioning between cells, such as in fast mobility conditions and/or when using modern, highthroughput cellular networks, such as LTE, which use smaller cell sizes and allow deployment of small cells. However, much of the system information read by a wireless communication device when transitioning to a new cell is often duplicative of system information read from the previous serving cell of the device. In this regard, adjacent cells often have the same or similar common channels configuration, cell reselection parameters, and/or system information schedule (also referred to as a system information "life cycle"). As such, a wireless communication device often expends power and overhead to read system information already known to the device when transitioning to a neighboring cell.

Some example embodiments disclosed herein provide for reducing an amount of system information read by a wireless communication device. More particularly, some example embodiments group cells that have a continuous geographical coverage area and that share at least a portion of their system information in common (e.g., common channels configuration, cell reselection parameters, system information schedule, and/or other system information that can be common between two or more cells having a continuous geographical coverage area) into a cell group. Thus, when a wireless communication device in accordance with such example embodiments transitions between cells within a cell group, the wireless communication device can selectively read only that system information broadcast by its new serving cell that is different from system information read from a previous serving cell within the cell group rather than reading all system information broadcast by the new serving cell. As such, the wireless communication device can reduce processing overhead and power consumption by reading only that portion of system information that has changed between cells when moving between cells within a cell group. However, if the wireless communication device of such example embodiments moves to a new cell that is in another cell group and/or that is otherwise outside of the cell group, the wireless communication device can read all of the system information that broadcast by the new cell.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 illustrates a wireless communication system 100 in accordance with some example embodiments. The system 100 can include a wireless communication device 102, which, by way of non-limiting example, can be a cellular phone, such as a smart phone device, a tablet computing device, a laptop computing device, a media device, a cellular wireless hotspot device, a wearable device, such as a smart watch, and/or other computing device that can be configured to operate on a cellular network.

The system 100 can additionally include a plurality of cells to which a wireless communication device 102 can connect. Each cell can cover a geographic area extending from a centralized access point (e.g., access point 106 or neighbor access point 108). An access point for a cell can be any appropriate type of cellular access point, such as, by way of non-limiting example, a base station, base transceiver station, node B, evolved node B (eNB), home eNB, and/or the like, and can vary depending on a type of radio access technology (RAT) implemented by the cell. The access point associated with a respective cell, such as the serving cell 104 or a neighbor cell 110, can broadcast signals that can be received by the wireless communication device 102 when the wireless communication device 102 is within signaling range of the cell. These broadcast signals can include system information associated with the cell.

Each respective cell, such as serving cell 104 and neighbor cells 110, in the system 100 can implement any respective cellular RAT. By way of non-limiting example, a cell in the system 100 can implement an LTE RAT, such as LTE, LTE-Advanced (LTE-A), and/or the like. As a further example, a cell in the system 100 can implement a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1×RTT; and/or the like. As another example, a cell in the system 100 can implement a second generation (2G) cellular RAT, such as a Global System for Mobile Communications (GSM) RAT. It will be appreciated, however, that the foregoing examples of cellular RATs are provided by way of example, and not by way of limitation, as a cell in the system 100 can implement any respective present or future developed cellular RAT including, for example, various fifth generation (5G) technologies now in development. Moreover, it will be appreciated, that while in some example embodiments, the cells of the system 100 can each implement the same RAT, example embodiments can be implemented within mixed-RAT deployment scenarios such that the system 100 of some example embodiments can include cells using a mixture of RATs, such that, for example, the serving cell 104 can use a first RAT and one or more of the neighbor cells 110 can use a second RAT.

In the example of FIG. 1, the wireless communication device 102 can be camped on the serving cell 104, served by the access point 106. As such, the wireless communication device 102 can receive transmissions from the serving cell 104 (e.g., from access point 106). During operation, the wireless communication device 102 can transition, such as via reselection or handover, from the serving cell 104 to a neighbor cell 110. For example, the wireless communication device 102 can transition to a neighbor cell 110 in response to a signal strength from the serving cell 104 falling below a defined threshold strength, such as can occur during mobility when the wireless communication device 102 can move away from the access point 106 and toward a neighbor access point 108 associated with a respective neighbor cell 110. A transition from serving cell 104 to a neighbor cell 110 can, for example, be an intra-frequency transition (same RAT, same frequency), inter-frequency transition (same RAT, different frequency), or an inter-RAT transition (transition from a cell using a first RAT to a cell using a second RAT).

In accordance with some example embodiments as described further herein below, when the wireless communication device 102 transitions from serving cell 104 to a new cell, such as a neighbor cell 110, the wireless communication device 102 can selectively read a portion (e.g., a subset) of system information that can be broadcast by the new cell in an instance in which the serving cell 104 and the new cell are in the same cell group. The portion of system information that can be read from the new cell can be comprised of a portion of system information that is different from system information read from the serving cell 104 and/or from another previous serving cell in the cell group. If, however, the new cell is not in the same cell group as the serving cell 104, the wireless communication device 102 can read all system information that can be broadcast by the new cell.

Figure 2:
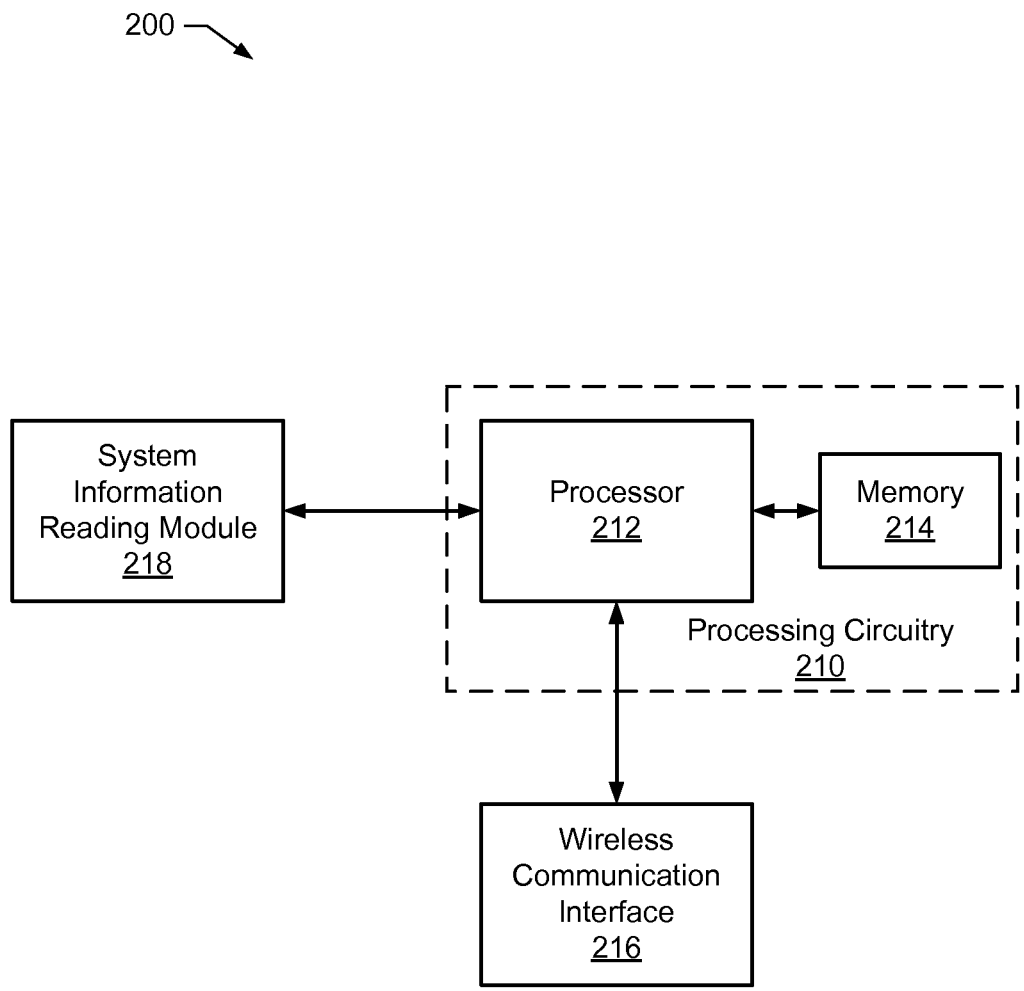
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of a computing device, such as the wireless communication device 102, on which the apparatus 200 may be implemented. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more integrated circuits (e.g., chipsets), which can each include one or more chips. The processing circuitry 210 and/or one or more further components of the apparatus 200 can therefore, in some instances, be configured to implement an embodiment on a single integrated circuit (e.g., as a system on a chip). In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to connect to and operate over one or more cellular networks. In accordance with some example embodiments, one or more components of the apparatus 200 can provide a cellular baseband chipset.

In some example embodiments, the processing circuitry 210 can include a processor 212 and, in some embodiments, such as that illustrated in FIG. 2, can further include memory 214. The processing circuitry 210 can be in communication with or otherwise control a wireless communication interface 216 and/or system information reading module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the wireless communication device 102 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, wireless communication interface 216, and system information reading module 218 via a bus (or buses) for passing information among components of the apparatus 200.

The apparatus 200 can further include a wireless communication interface 216. The wireless communication interface 216 can be configured to enable the apparatus 200 to send wireless signals to and receive signals from a wireless network, such as by sending signals to and receiving signals from an access point for the network. In this regard, the wireless communication interface 216 can include one or more transceivers and supporting hardware and/or software for enabling wireless communication with a wireless network and/or remote device. The wireless communication interface 216 can be configured to support any type of RAT that may be implemented in the system 100 and/or otherwise supported by the wireless communication device 102. For example, the wireless communication interface 216 of some example embodiments can be configured to support accessing a cellular network by enabling wireless communication with a cellular base station, such as access point 106 and/or neighbor access point 108.

The apparatus 200 can further include system information reading module 218. The system information reading module 218 can be embodied as various means, such as circuitry, hardware, a computer program product comprising a computer readable medium (for example, the memory 214) storing computer readable program instructions that are executable by a processing device (for example, the processor 212), or some combination thereof. The system information reading module 218 can be configured to selectively read system information broadcast by a cell based at least in part on whether the cell is a member of the same cell group as a previous serving cell in accordance with one or more example embodiments disclosed herein.

Figure 3:
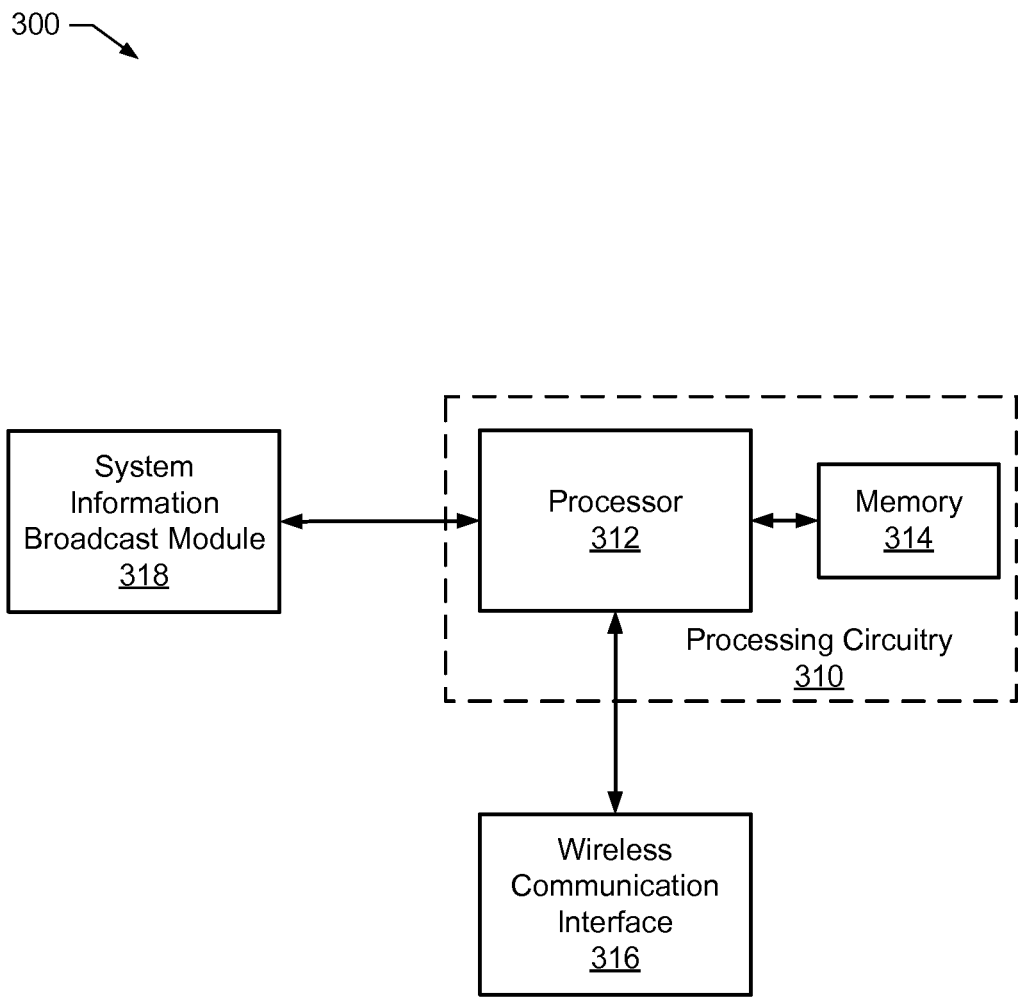
FIG. 3 illustrates a block diagram of an apparatus that can be implemented on a network entity in accordance with some example embodiments.

FIG. 3 illustrates a block diagram of an apparatus 300 that can be implemented on a network entity in accordance with some example embodiments. For example, the apparatus 300 can be implemented on a network access point (e.g., access point 106 and/or neighbor access point 108) and/or other network entity that can be associated with a cell. In some example embodiments, the apparatus 300 can comprise a distributed apparatus such that elements of the apparatus 300 can be distributed across a plurality of apparatuses (e.g., a plurality of network entities), which can be in operative communication with each other to provide functionality of a network entity that may be configured to format and/or broadcast system information in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of a computing device on which the apparatus 300 can be implemented in accordance with various example embodiments, and thus can provide means for performing functionalities of a network access point and/or other network entity in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more integrated circuits (e.g., chipsets), which can each include one or more chips. The processing circuitry 310 and/or one or more further components of the apparatus 300 can therefore, in some instances, be configured to implement an embodiment on an integrated circuit (e.g., as system on a chip).

In some example embodiments, the processing circuitry 310 can include a processor 312 and, in some embodiments, such as that illustrated in FIG. 3, can further include memory 314. The processing circuitry 310 can be in communication with or otherwise control a wireless communication interface 316 and/or system information broadcast module 318.

The processor 312 can be embodied in a variety of forms. For example, the processor 312 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments including a plurality of processors, the plurality of processors can be distributed across a plurality of apparatuses (e.g., a plurality of network entities), which can be in operative communication with each other to provide functionality of a network entity that may be configured to format and/or broadcast system information in accordance with one or more example embodiments. In some example embodiments, the processor 312 can be configured to execute instructions that can be stored in the memory 314 or that can be otherwise accessible to the processor 312. As such, whether configured by hardware or by a combination of hardware and software, the processor 312 can be capable of performing operations according to various embodiments while configured accordingly.

In some example embodiments, the memory 314 can include one or more memory devices. Memory 314 can include fixed and/or removable memory devices. In some example embodiments including a plurality of memory devices, the plurality of memory devices can be distributed across a plurality of apparatuses (e.g., a plurality of network entities), which can be in operative communication with each other to provide functionality of a network entity that may be configured to format and/or broadcast system information in accordance with one or more example embodiments. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, wireless communication interface 316, or system information broadcast module 318 via a bus (or buses) for passing information among components of the apparatus 300.

The apparatus 300 can further include wireless communication interface 316. The wireless communication interface 316 can be configured to enable the apparatus 300 to send wireless signals to and receive signals from one or more wireless communication devices, such as the wireless communication device 102. In this regard, the wireless communication interface 216 can include one or more transceivers and supporting hardware and/or software for enabling wireless communication between a network entity on which the apparatus 300 can be implemented and a wireless communication device. As such, the wireless communication interface 316 can be configured to support any type of RAT that may be implemented in the system 100 and/or otherwise supported by the wireless communication device 102.

The apparatus 300 can further include system information broadcast module 318. The system information broadcast module 318 can be embodied as various means, such as circuitry, hardware, a computer program product comprising a computer readable medium (for example, the memory 314) storing computer readable program instructions executable by a processing device (for example, the processor 312), or some combination thereof. In some embodiments, the processor 312 (or the processing circuitry 310) can include, or otherwise control the system information broadcast module 318. The system information broadcast module 318 can be configured to format system information including cell group information and control broadcast of the system information in accordance with various example embodiments.

In accordance with some example embodiments, a cell group can be defined to include a group of contiguous cells having a continuous geographical coverage. In some example embodiments, cells grouped into the same cell group can use the same RAT. In some example embodiments, all cells in a cell group can share at least a portion of their system information in common. For example, in some example embodiments, all cells in a cell group can share a common channel(s) configuration, a common system information schedule, a common system information life cycle, and/or other system information in common. In accordance with some example embodiments, a cell can only belong to a single cell group (i.e., to one and only one cell group).

Depending on the deployment arrangement of cells in a cell group, one or more (or even all) cells in the cell group can have the same neighbor cells. However, in some instances, two or more cells (or even all) cells in a cell group can each have different neighbor cells. The neighbor cells of a cell in a cell group can include one or more intra-frequency cells, one or more inter-frequency cells, one or more inter-RAT (iRAT) cells, and/or other cell type.

Figure 4:
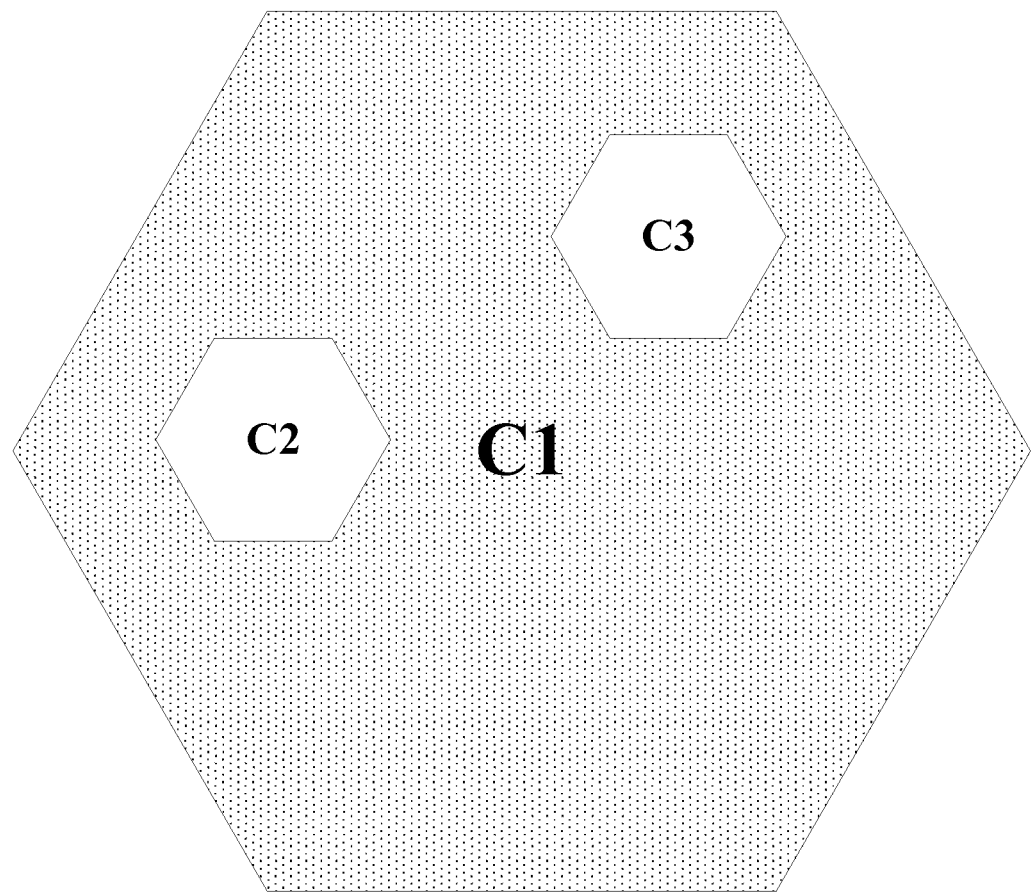
FIG. 4 illustrates an example cell group in accordance with some example embodiments.

FIG. 4 illustrates an example cell group in accordance with some example embodiments. In the example of FIG. 4, C2 and C3 can be small cells deployed within the coverage area of C1. C1-C3 can be grouped into the same cell group. In this regard, C1-C3 can comprise a group of contiguous cells having a continuous geographical coverage, and can share at least a portion of their system information in common. In some instances, C1-C3 can additionally have the same neighbor cells list.

Figure 5:
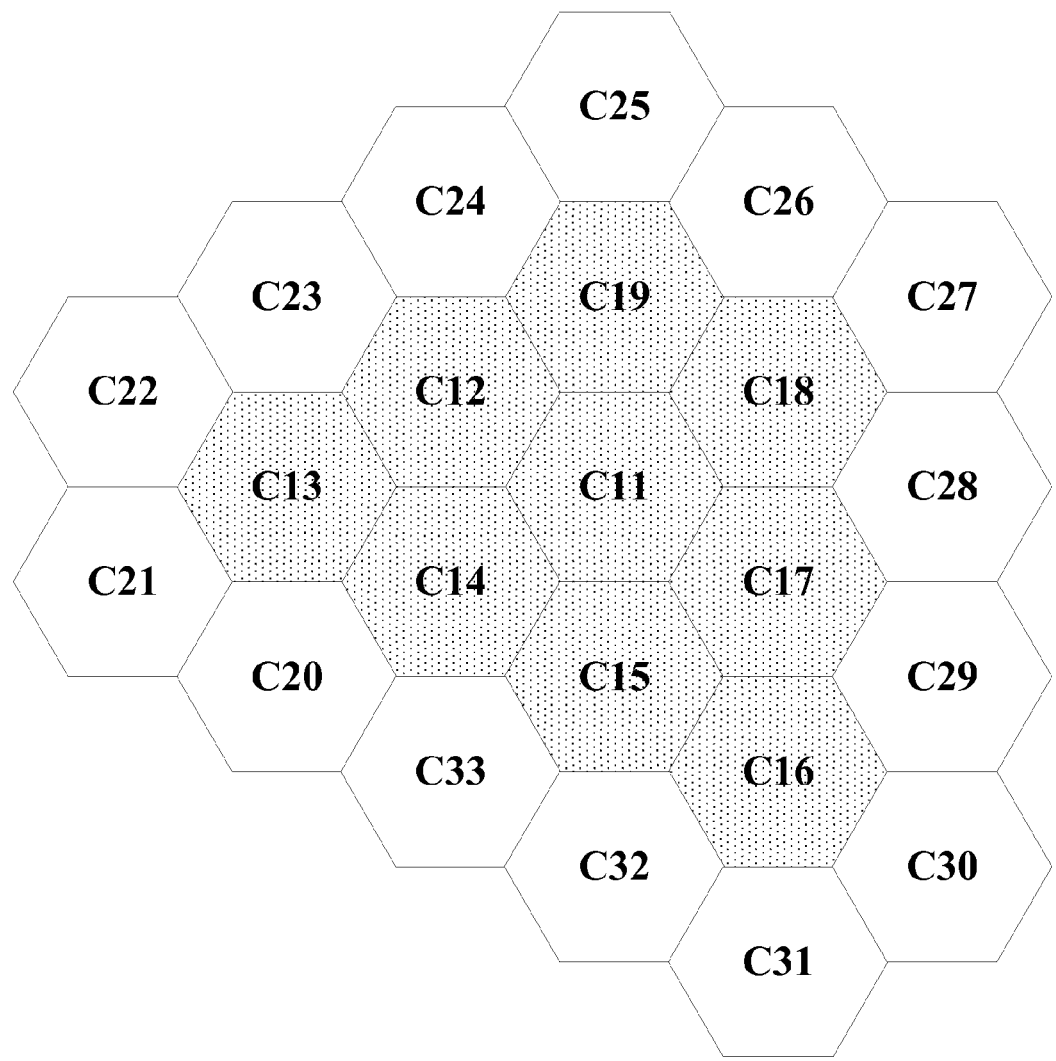
FIG. 5 illustrates another example cell group in accordance with some example embodiments.

FIG. 5 illustrates another example cell group in accordance with some example embodiments. In the example of FIG. 5, C11-C19 are grouped into one cell group. In this regard, C11-C19 can comprise a group of contiguous cells having a continuous geographical coverage, and can share at least a portion of their system information in common. In the example of FIG. 5, Each of C11-C19 has a different neighbor cells list. For example, the neighbor cells list for C11 includes C12, C 14, C15, C17, C18, and C19, each of which is in the same cell group. The neighbor cells list for C17 includes C11, C15, C16, and C18, which are in the same cell group, as well as C28 and C29, which are not in the cell group.

When the wireless communication device 102 moves within a geographical area covered by a cell group (e.g., transitioning from a first cell in the cell group to a second cell in the cell group), the wireless communication device 102 of some example embodiments can selectively read a portion of system information broadcast on the BCH and/or other channel on which system information can be broadcast by a cell. In this regard, the wireless communication device 102 of some example embodiments can be configured to selectively read only the system information which is different (e.g., the "delta") from system information read from a previous serving cell in the cell group. The changed system information can, for example, be the neighbor cells list of the new cell. Thus, for example, if the wireless communication device 102 transitions from C1 to C2 in the example cell group of FIG. 4, the wireless communication device 102 can avoid reading system information broadcast by C2 in some instances in which C1 and C2 have the same neighbor cells list. However, if the wireless communication device 102 transitions from C15 to C16 in the example cell group of FIG. 5, the wireless communication device 102 can, in some instances, read the neighbor cells list for C16, but can decide not to read system information common to the cells in the cell group that was already read from C15 and/or from another cell in the cell group.

In order to provide knowledge of cell group deployment to the wireless communication device 102, a network entity, such as an access point (e.g., access point 106 and/or a neighbor access point 108) associated with a cell, can format system information to include cell group information indicating that the cell is a member of a cell group and indicating the membership of the cell group. The membership of the cell group can be indicated by including identifiers for the one or more further cells in the cell group. As such, the wireless communication device 102 of some example embodiments can determine the membership of a cell group by reading broadcast system information that includes cell group information. When the wireless communication device 102 transitions to a new cell, the wireless communication device 102 can use the previously read cell group information to determine if the new cell is in the same cell group. If the new cell is in the same group, the wireless communication device 102 can be configured to selectively read only a portion of the system information broadcast by the new cell. However, if the new cell is not in the same cell group, the wireless communication device 102 can be configured to read all of the system information broadcast by the new cell.

In some example embodiments, the cell group information that can be broadcast by a cell in a cell group can further include a neighbor cells list of the cell group, which can identify one or more cells neighboring a geographic boundary defined by cells in the cell group. For example, in the example cell group of FIG. 5, the neighbor cells list of the cell group can include cells C20-C33. This information can, for example, be used by the wireless communication device 102 to determine when it has left the coverage area of a cell group.

In some example embodiments, broadcast cell group information can include an indication of whether all cells in the cell group have the same neighbor cells list. This indication can, for example, comprise a Boolean variable, a 1-bit flag, and/or other indication that can be included in system information. If each cell in a cell group has the same neighbor cells list, then the wireless communication device 102 can read the neighbor cells list from a first serving cell in a cell group and can avoid reading the neighbor cells list when transitioning to a second cell in the cell group. Thus, for example, in an instance in which the wireless communication device 102 moves from C1 to C2 in the example cell group of FIG. 4, the wireless communication device 102 can avoid reading system information broadcast by C2 in instances in which C1 and C2 have the same neighbor cells list and the wireless communication device 102 has a priori knowledge that C1 and C2 have the same neighbor cells list from cell group information that can be included in system information broadcast by C1 and/or other previous serving cell in the cell group.

In some example embodiments, system information that can be broadcast by a cell can include a neighbor cells list for each cell in the cell group. In such example embodiments, when the wireless communication device 102 moves within the coverage area of a cell group, the wireless communication device 102 can read neighbor cells list information from one cell in the cell group (e.g., a first serving cell in the cell group) and can forego reading neighbor cells list information from a subsequent serving cell(s) in the cell group, as the wireless communication device 102 can already have knowledge of the neighbor cells list for each cell in the cell group from system information read from a previous cell. It will be appreciated, however, that in some example embodiments, a cell can broadcast only its own neighbor cells list rather than broadcasting the neighbor cells list of each cell in the cell group.

Cell group information that can be broadcast in accordance with various example embodiments can be included in any portion of system information that can be broadcast by a cell. In some example embodiments, the organization of cell group information within broadcast system information can vary by RAT. For example, in UMTS cells, neighbor cells list information for one or more cells in the cell group and/or a neighbor cells list for the cell group as a whole can, for example, be included in System Information Block (SIB) 11 and/or SIB 12. As another example, in LTE cells, neighbor cells list information for one or more cells in the cell group and/or a neighbor cells list for the cell group as a whole can, for example, be included in one or more of SIB 4, SIB 5, SIB 6, SIB 7, or SIB 8. For example, in some embodiments, neighbor cells information for any intra-frequency neighboring cells can be included in SIB 4; neighbor cells information for any inter-frequency neighboring cells can be included in SIB 5; neighbor cells information for any neighboring inter-RAT UMTS Terrestrial Radio Access Network (UTRAN) cells can be included in SIB 6; neighbor cells information for any neighboring inter-RAT GSM EDGE Radio Access Network (GERAN) cells can be included in SIB 7; and neighbor cells information for any neighboring inter-RAT CDMA2000 cells can be included in SIB 8. The wireless communication device 102 can have a priori knowledge of the organization of system information (e.g., based on RAT), and can use this knowledge to determine which portions of system information to selectively read when transitioning to a new cell within a cell group.

In some example embodiments, the neighbor cells list information that can be included in broadcast system information can be organized to reduce the system information size associated with the cell group feature of some example embodiments. For example, the membership of a cell group can be identified in the cell group information through use of a member cells list for the cell group with respective cell identifiers, e.g., <1 . . . MaxCellofCG>. In this regard, the membership of the cell group in the example of FIG. 4 can, for example, be indicated as: <C1, C2, C3>. The membership of the cell group in the example of FIG. 5 can, for example, be indicated as: <C11, C12, C13, C14, C15, C16, C17, C18, C19> or <C11, C19>, where it can be understood that the sequential cells between C11 and C19 (e.g., C12-C18) are included in the cell group. The member cells list can include basic information for each member cell and an index and/or other identifier for each member cell. The member cells list for a cell group can be common for all cells in the cell group. As such, the wireless communication device 102 may only read this information once and can forego reading the information when transitioning to another cell within the cell group.

In embodiments in which a neighbor cells list of the cell group as a whole (e.g., a list identifying one or more cells neighboring a geographic boundary defined by cells in the cell group as a whole) is included in broadcast cell group information, the neighbor cells can be organized according to RAT and/or carrier information. For example, in the example of FIG. 5, C20-C33 can be organized according to RAT and/or carrier information in a neighbor cells list for the cell group. Organization of the neighbor cells list of the cell group based on RAT and carrier information can, for example, be defined as follows (e.g., for each RAT):

---
i. RAT: e.g., <3G, UTRA FDD, UTRA TDD, LTE FDD, LTE FDD, etc.>
  1. Carrier Frequency (Freq) Info: e.g., <1... MaxFreq>
    a. Common Info on Carrier Freq: e.g. ARFCN, etc.
    b. Cell List on one carrier: e.g., <1..MaxCell>
      i. Basic Info for each cell and index

---

The neighbor cells list for a cell group as a whole can be common for all cells in the cell group. As such, the wireless communication device 102 can be configured to only read this information once and can forego reading the information when transitioning to another cell within the cell group.

The neighbor cell list for a respective cell in a cell group, such as C1-C3 in the example of FIG. 4 and/or C11-C19 in the example of FIG. 5, can be defined for each cell in the cell group <1 . . . MaxCell> as a series of indexes and/or other identifiers identifying the cells in a cell group and a respective neighbor cells associated with each index. Thus, with respect to the example of FIG. 5, the neighbor cells list for each of C11-C19 can be defined with an index for a respective member cell and an associated list of the subset of C20-C33 bordering the respective member cell. The neighbor cells list for a cell in the cell group can vary from cell to cell within the cell group. As such, in some example embodiments, the wireless communication device 102 can read the neighbor cells list for a new cell when moving to another cell within the cell group.

However, in some example embodiments, one or more cells in a cell group can broadcast the neighbor cells list for each cell in the cell group. In such embodiments, the wireless communication device 102 can read the neighbor cells list for each cell in the cell group from the first cell serving the wireless communication device 102 within the cell group, and can then avoid reading the neighbor cells list information from a second cell in the cell group when transitioning to the second cell.

Figure 6:
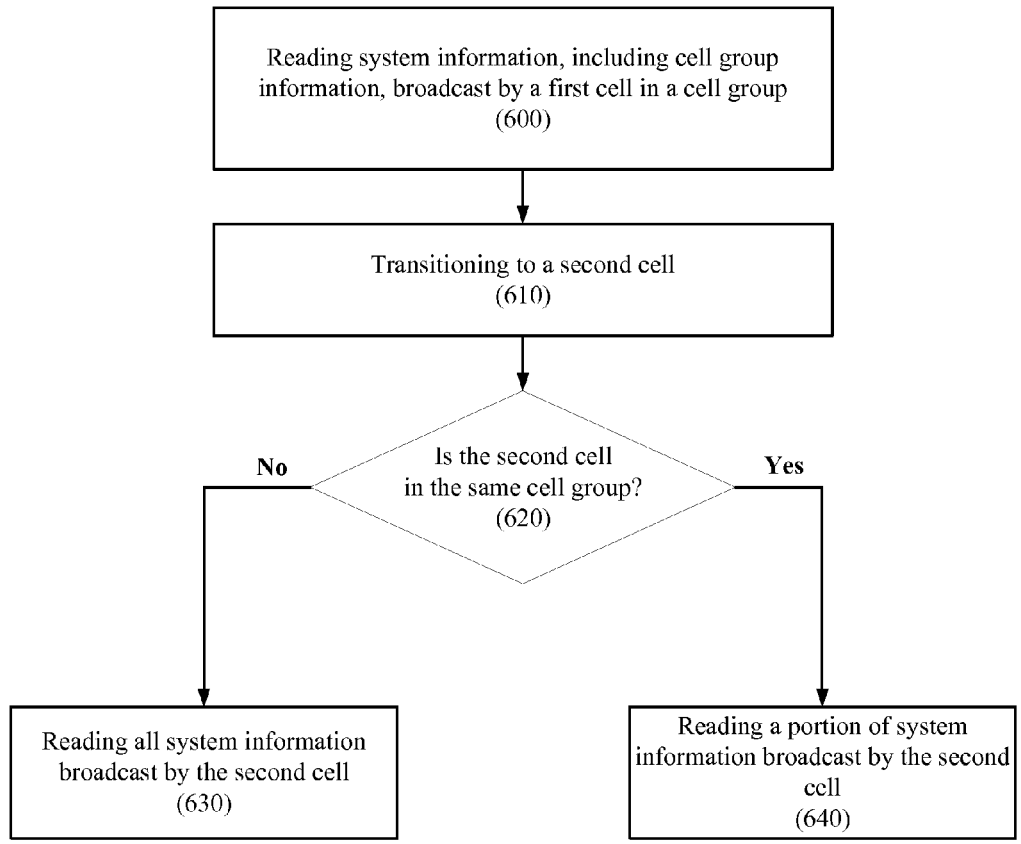
FIG. 6 illustrates a flowchart of an example method for selectively reading system information according to some example embodiments.

FIG. 6 illustrates a flowchart of an example method for selectively reading system information according to some example embodiments. In this regard, FIG. 6 illustrates operations that can be performed by the wireless communication device 102 in accordance with some example embodiments. One or more of processing circuitry 210, processor 212, memory 214, wireless communication interface 216, or system information reading module 218 can, for example, provide means for performing the operations illustrated in and described with respect to FIG. 6.

Operation 600 can include the wireless communication device 102 reading system information broadcast by a first cell in a cell group. The system information can include cell group information. The cell group information can identify the first cell as a member of the cell group, and can identify one or more further member cells of the cell group.

Operation 610 can include the wireless communication device 102 moving to a second cell. Operation 620 can include the wireless communication device 102 determining whether the second cell is in the same cell group as the first cell based on the cell group information read from the first cell. For example, operation 620 can include determining whether an identifier associated with the second cell (e.g., as may be broadcast by the second cell) corresponds to an index and/or other identifier of a cell identified as a member of the cell group by the cell group information read from the first cell.

In an instance in which it is determined that the second cell is not in the same cell group, the method can proceed to operation 630, and the wireless communication device 102 can read all system information broadcast by the second cell. If, however, it is determined that the second cell is in the same cell group, the method can instead proceed to operation 640, and the wireless communication device can selectively read a portion (e.g., a subset) of system information broadcast by the second cell. The read portion can include any system information of the second cell that is different from the system information read from the first cell, such as, by way of non-limiting example, a neighbor cells list for the second cell.

Figure 7:
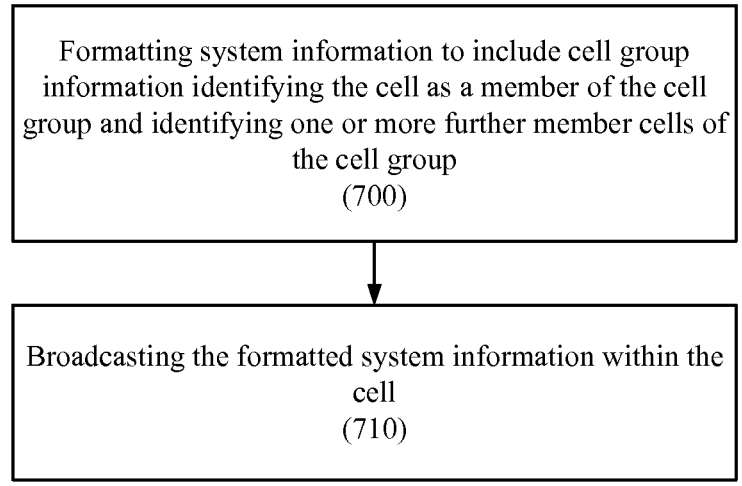
FIG. 7 illustrates a flowchart of an example method for broadcasting cell group information to facilitate reduction of an amount of system information read by a wireless communication device according to some example embodiments.

FIG. 7 illustrates a flowchart of an example method for broadcasting cell group information to facilitate reduction of an amount of system information read by a wireless communication device according to some example embodiments. In this regard, FIG. 7 illustrates operations that can be performed by a network entity, such as an access point (e.g., a base station, base transceiver station, node B, eNB, and/or the like) and/or other entity, associated with a cell in a cell group. One or more of processing circuitry 310, processor 312, memory 314, wireless communication interface 316, or system information broadcast module 318 can, for example, provide means for performing the operations illustrated in and described with respect to FIG. 7.

Operation 700 can include a network entity formatting system information to include cell group information identifying the cell as a member of the cell group and identifying one or more further member cells of the cell group. Operation 710 can include the network entity broadcasting the formatted system information within the cell.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for selectively reading system information, the method comprising a wireless communication device:
   reading system information broadcast by a first cell, wherein system information read from the first cell comprises cell group information identifying the first cell as a member of a cell group and identifying one or more further member cells of the cell group;
   transitioning from the first cell to a second cell;
   determining based at least in part on the cell group information that the second cell is also a member of the cell group; and
   in response to determining that the second cell is also a member of the cell group, selectively reading only a portion of system information broadcast by the second cell that is comprised of system information that is different from the system information read from the first cell.

2. The method of claim 1, wherein the portion of system information broadcast by the second cell comprises a neighbor cells list of the second cell.

3. The method of claim 1, wherein the cell group is comprised of a plurality of cells sharing one or more of a common channel configuration, a common system information schedule, a common system information life cycle, and a common radio access technology (RAT).

4. The method of claim 1, wherein the cell group is comprised of a plurality of contiguous cells.

5. The method of claim 1, wherein each cell that is a member of the cell group is a member of only one cell group.

6. The method of claim 1, wherein the cell group information further comprises a neighbor cells list for the cell group, wherein the neighbor cells list for the cell group identifies one or more cells neighboring a geographic boundary defined by cells in the cell group.

7. The method of claim 1, further comprising the wireless communication device:
   transitioning to a third cell;
   determining that the third cell is not a member of the cell group; and
   in response to determining that the third cell is not a member of the cell group, reading all system information broadcast by the third cell.

8. A wireless communication device comprising:
   at least one transceiver, the at least one transceiver configured to send wireless signals to and receive wireless signals from a wireless network; and
   processing circuitry coupled with the at least one transceiver, wherein the processing circuitry is configured to cause the wireless communication device to at least:
      read system information broadcast by a first cell, wherein system information read from the first cell comprises cell group information identifying the first cell as a member of a cell group and identifying one or more further member cells of the cell group;
      transition from the first cell to a second cell;
      determine, based at least in part on the cell group information, whether the second cell is also a member of the cell group;
      selectively read only a portion of system information broadcast by the second cell when it is determined that the second cell is also a member of the cell group; and
      read all system information broadcast by the second cell when it is determined that the second cell is not a member of the cell group.

9. The wireless communication device of claim 8, wherein the portion of system information broadcast by the second cell is comprised of system information that is different from the system information read from the first cell.

10. The wireless communication device of claim 8, wherein the portion of system information broadcast by the second cell comprises a neighbor cells list of the second cell.

11. The wireless communication device of claim 8, wherein the cell group is comprised of a plurality of cells sharing one or more of a common channel configuration, a common system information schedule, a common system information life cycle, and a common radio access technology (RAT).

12. The wireless communication device of claim 8, wherein the cell group is comprised of a plurality of contiguous cells.

13. The wireless communication device of claim 8, wherein each cell that is a member of the cell group is a member of only one cell group.

14. The wireless communication device of claim 8, wherein the cell group information further comprises a neighbor cells list for the cell group.

15. A method for facilitating reduction in an amount of system information read by a wireless communication device, the method comprising a network entity associated with a first cell:
    formatting system information to include cell group information, wherein the cell group information:
        identifies the first cell as a member of a cell group,
        identifies one or more further member cells of the cell group,
        indicates whether all cells in the cell group have a same neighbor cells list, and
        provides a neighbor cells list for the cell group; and
    broadcasting the system information within the first cell.

16. The method of claim 15, wherein the cell group is comprised of a plurality of cells sharing one or more of a common channel configuration, a common system information schedule, a common system information life cycle, and a common radio access technology (RAT).

17. The method of claim 15, wherein the cell group is comprised of a plurality of contiguous cells.

18. The method of claim 15, wherein each cell in the cell group is a member of only one cell group.

19. The method of claim 15, wherein the network entity comprises a base station.

20. The method of claim 15, wherein the broadcasting comprises broadcasting the system information in a System Information Block.

\* \* \* \* \*